US006028750A

United States Patent [19]

Ohtsubo

[11] Patent Number: 6,028,750

[45] Date of Patent: Feb. 22, 2000

[54] THIN FILM MAGNETIC HEAD SUBSTRATE WITH IMPROVED HEAT RADIATION

[75] Inventor: Takaki Ohtsubo, Kyoto, Japan

[73] Assignee: Kyocera Corporation, Kyoto, Japan

[21] Appl. No.: 09/064,434

[22] Filed: Apr. 22, 1998

[30] Foreign Application Priority Data

Apr. 25, 1997 [JP] Japan .................................... 9-109932

[51] Int. Cl.$^{7}$ ...................................................... G11B 5/147

[52] U.S. Cl. ............................................................. 360/126

[58] Field of Search ...................................... 360/126, 113

[56] References Cited

U.S. PATENT DOCUMENTS 5,901,021 5/1999 Hirano .................................... 360/126

*Primary Examiner*—A. J. Heinz
*Attorney, Agent, or Firm*—Loeb & Loeb, LLP

[57] ABSTRACT

There is obtained a substrate for thin film magnetic head having extremely excellent heat radiation and insulation properties and extremely flat surface. On a substrate comprising ceramics or single crystal member, a substrate for thin film magnetic head is constituted with a high thermal conductive insulating film having a thickness in the range of 10–1500 Å, thermal conductivity at room temperature higher than 45 W/m·K, and volume inherent resistance higher than $10^8$ Ω·cm.

10 Claims, 2 Drawing Sheets

THIN FILM MAGNETIC HEAD SUBSTRATE WITH IMPROVED HEAT RADIATION

BACKGROUND OF THE INVENTION

The present invention relates to a substrate for thin film magnetic head to be used for the hard disk drive, tape drive, etc. which are the recording apparatuses for computer, and a thin film magnetic head using the same.

As the conventional substrate for thin film magnetic head, there is used a substrate comprising ceramics formed mainly of $Al_2O_3$ and TiC, on which amorphous alumina film is formed by sputtering process as ground layer, and its surface is finished into mirror surface with a one-side polishing machine. And, on the resulting ground film, an element is formed by magnetic film to constitute a magnetic head.

The ground film comprising the amorphous alumina film as above is necessary for forming an insulation activity with the $Al_2O_3$—TiC ceramics substrate which are the conductive materials and obtaining a smooth surface. Especially, because the elements are formed with a magnetic film on the ground film, a smoother surface is required. For this purpose, it is now becoming general to make polishing with CMP (Chemical Mechanical Polishing) and the like.

In recent years, in order to improve recording density, there has been introduced MR (Magnetoresistive) using magnetic resistance effect or GMR (Giant MR). And, in order to improve read sensitivity of MR or GMR element, it has become necessary to increase the sense current density, with the result of providing a drawback of easiness to cause heat in the vicinity of the element.

Also, in recent years, in the cases of the MR and GMR heads for hard disk drive, the head floating up amount has become as small as about 1 microinch, or close to the near contact. For this reason, the magnetic head and the medium are liable to slide under contact, and the friction heat produced at this time provides temperature variation of the MR element part of the thin film magnetic head, thereby causing variation of sensitivity. Such a thermal asperity phenomenon has also become a significant problem.

Accordingly, it has been required to improve the heat radiation in the vicinity of the elements of the thin film magnetic head. With the conventional substrate for thin film magnetic head, however, it has not been possible to meet such requirement.

SUMMARY OF THE INVENTION

In view of the above, the present invention is characterized by constituting a substrate for thin film magnetic head by furnishing a high thermal conductive insulation film having thermal conductivity at room temperature of more than 45 W/m·cm, with the volume inherent resistance of more than $10^8$ Ω·cm, and the thickness of 10–1500 Å, being formed on a substrate comprising ceramics or a single crystal.

That is to say, by providing a high thermal conductive insulating film on a substrate, heat radiation in the vicinity of the element is improved to solve the above problems.

Another feature of the present invention is in having constituted a substrate for the thin film magnetic head by providing a high thermal conductive insulating film comprising one or more of Aluminum Nitride (AlN), Boron Nitride (BN), diamond like carbon, and amorphous carbon (DLC) having a thickness of 10–1500 Å on a ground film of amorphous alumina or the like formed on a substrate comprising $Al_2O_3$—TiC ceramics.

If a high thermal conductive insulating film is formed direct on the substrate of $Al_2O_3$—TiC ceramics, the film is required to have more than 2 μm thickness in order to obtain electrical pressure resistance and polishing margin, which is liable to cause deformation or release or the like of substrate. For this reason, by previously forming a ground film of amorphous alumina or the like on the substrate of $Al_2O_3$—TiC ceramics and providing insulation and smoothness to the surface, the high thermal conductive insulation film to be formed thereon can be thin at 10–1500 Å, and the tight contact strength can be increased.

Furthermore, the present invention has a feature of having constituted a substrate for the thin film magnetic head by providing a high thermal conductive insulating film comprising one or more of AlN, BN, DLC, and amorphous carbon having a thickness of 10–1500 Å on a substrate comprising a single crystal.

Namely, when a single crystal such as a single crystal sapphire or a single crystal MgO as a substrate, the substrate can have insulation property and extremely smooth surface, so that a high thermal conductive insulating film can be directly formed the surface, thinly formed at 10–1500 Å and tight contact property can be improved.

The present invention is also characterized in that the surface of the high thermal conductive insulating film of the substrate for thin film magnetic head mentioned above has surface roughness (Ra) determined by the AFM (Atomic Force Microscopy) of no more than 10 Å.

Namely, by making the surface very smooth at no more than 10 Å of surface roughness (Ra), the magnetic film can be formed in high precision thereon.

Furthermore, the present invention is characterized by constituting the magnetic head by forming a magnetic film on the high thermal conductive insulating film of the substrate for the thin film magnetic head mentioned above.

DETAILED DESCRIPTION OF PREFERRED EMBODIMENTS

Hereinafter, an embodiment of the present invention is illustrated by way of the drawings.

Figure 1A:
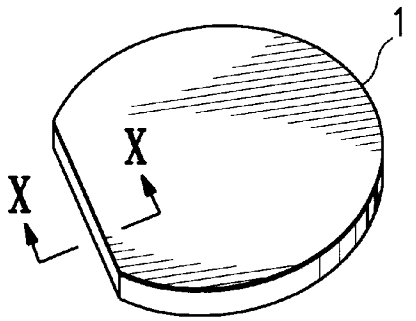
FIG. 1(*a*) and (*b*) are the perspective views showing the substrate for the thin film magnetic head of the present invention.
Figure 1B:
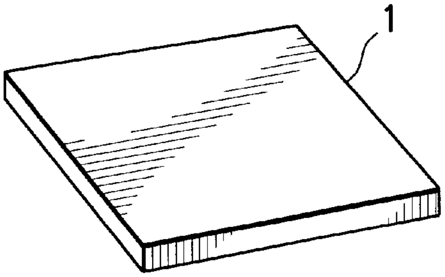

The substrate 1 for the thin film magnetic head of the present invention has a disk form of 2–6 inches in diameter having an orientation flat as shown in FIG. 1(*a*), or a square plate form of 3–8 inches in side as shown in FIG. 1 (*b*).

Figure 2A:
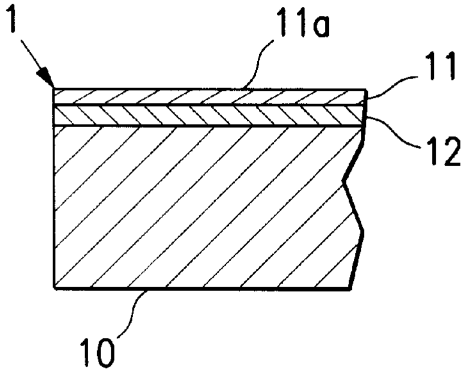
FIG. 2(*a*) and (*b*) are the X—X sectional views of FIG. 1(*a*).
Figure 2B:
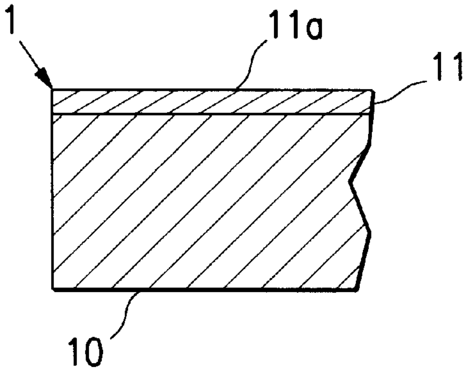

The substrate 1 for the thin film magnetic head is made by forming a ground film 12 such as an amorphous alumina on the surface of the substrate 10 comprising $Al_2O_3$—TiC ceramics as shown in FIG. 2(*a*), polishing said surface smoothly, and then forming the high thermal conductive insulating film 11.

And, the surface 11*a* of the high thermal conductive film 11 can be made extremely smooth surface, on which a magnetic film can be formed to make a thin film magnetic head. At this time, by the presence of the high thermal conductive insulating film 11, heat radiation in the area near the element can be elevated, so that even the MR head or GMR head may be suitably used.

For the $Al_2O_3$—TiC ceramics to form a substrate 10, there are the ceramics made of the material of 60–80% $Al_2O_3$ and 40–20% of TiC as the main components and obtained by subjecting to hot press or HIP treatment at 1600–1800° C. in atmosphere or reduced atmosphere. The $Al_2O_3$—TiC ceramics can be a very delicate sintered compact and can smooth the surface.

Also, the above $Al_2O_3$—TiC ceramics are the conductive materials, but they can have insulation properties by forming a ground film 12 of amorphous alumina film or the like on the substrate 10 and can be processed into smooth surface by polishing the ground film 12. It is desirable for the ground film 12 to be formed by sputtering process and its thickness to be in a range of 1–10 μm.

As another embodiment of the present invention, as shown in FIG. 2(*b*), it may be so practiced that the substrate 10 is formed of single crystal such as a single crystal sapphire or single crystal MgO, and a high thermal conductive insulating film 11 is formed on its surface. The single crystal sapphire is a single crystal of $Al_2O_3$, and can be produced by EFG process (Edge-defined Film Growth) which is to lift up the seed crystal from the molten $Al_2O_3$ or the like.

As described above, when a single crystal is used as a substrate 10, because the substrate 10 per se is an insulating material and the surface can be polished in extremely smoothly, a high thermal conductive insulating film 11 can be directly formed without necessity to form any ground film as in FIG. 1(*a*).

Also, in the embodiment shown in the above FIG. 2(*a*) and (*b*), the surface of the ground film 12 or the single crystal substrate 10 is preferably polished by CMP (Chemical Mechanical Polishing) process, so that its surface has no more than 1 Å of surface roughness (Ra) measured by Atomic Force Microscopy AFM.

And, a high thermal conductive insulating film 11 is formed on the smoothly polished surface as above. As a high thermal conductive film 11, there is used one having the thermal conductivity at room temperature of more than 45 W/m·K and the volume inherent resistance of more than $10^8$ Ω·cm. This is because, with the thermal conductivity at room temperature of less than 45 W/m·K the effect for improving the heat radiation in the area near the element is poor, and when the volume inherent resistance is less than $10^8$ Ω·cm, the insulating property is low and ill effect is given to the element.

Also, the thickness of the high thermal conductive insulating film 11 is 10–1500 Å. This is because, when the amount is less than 10 Å there is scarce effect of improving the heat radiation in the area near the element, while when the amount exceeds 1500 Å the film is liable to release.

With respect to the concrete material quality of the high thermal conductive insulating film 11, it is desirable to use one or more of AIN, BN, diamond like carbon (hereinafter to be referred to as DLC), and amorphous carbon, as shown in Table 1.

TABLE 1

| | Composition | Thermal conductivity (W/m · K) | Volume inherent resistance at R.T. (Ω · cm) |
|---|---|---|---|
| Present Invention | A1N | >100 | $10^{14}$ |
| | BN | 50 | $10^{14}$ |
| | DLC | >200 | $10^9$ |
| | Amorphous carbon | >200 | $10^{10}$ |
| Comparative Example | Alumina | 40 | $>10^{14}$ |
| | SiC | 42 | $10^3$–$10^4$ |

Also, for forming a high thermal conductive insulating film 11, there is used a procedure to give high film filling rate such as ECR plasma sputtering. As a target material to be used for forming these high thermal conductive ground film 11, if it contains oxide type impurities the film quality after the film formation is degraded to make it less easy to obtain necessary thermal conductivity, and defects of film surface is liable to occur. For this reason, it is desirable to use a high purity target material of more than 99%.

Furthermore, as a procedure for improving the tight contact strength of the high heat conductive insulating film 11, a buffer film of Si, $Si_2N_3$, etc. having a thickness of several scores of Å may be placed by intervention by a sputter process or the like on a substrate 10 comprising a ground film 12 or a single crystal.

Figure 3A:
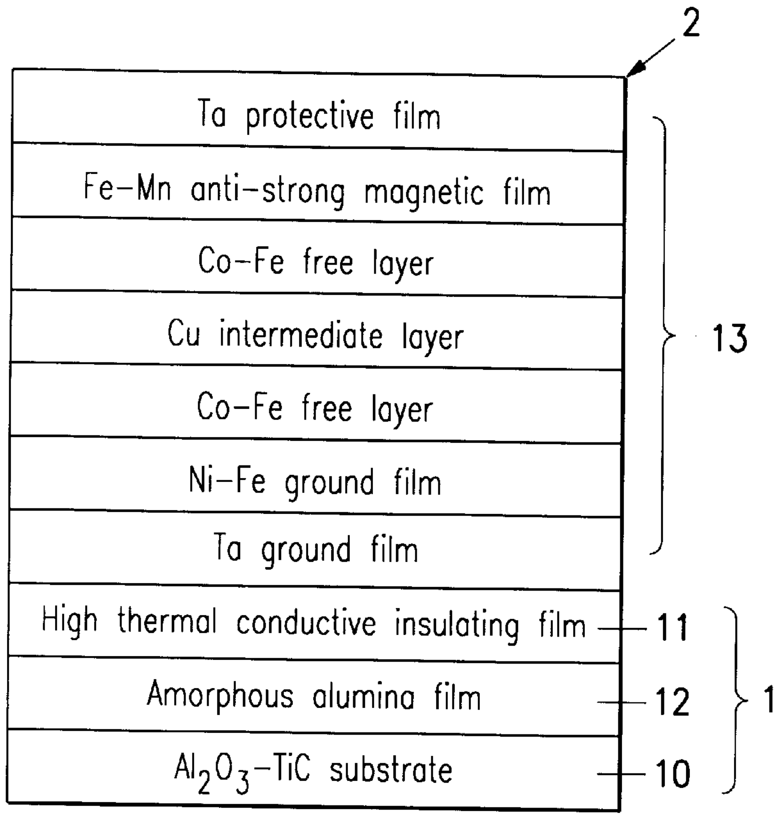
FIG. 3(*a*) and (*b*) are the views showing the typical constitution of the magnetic film of the thin film magnetic head of the present invention.
Figure 3B:
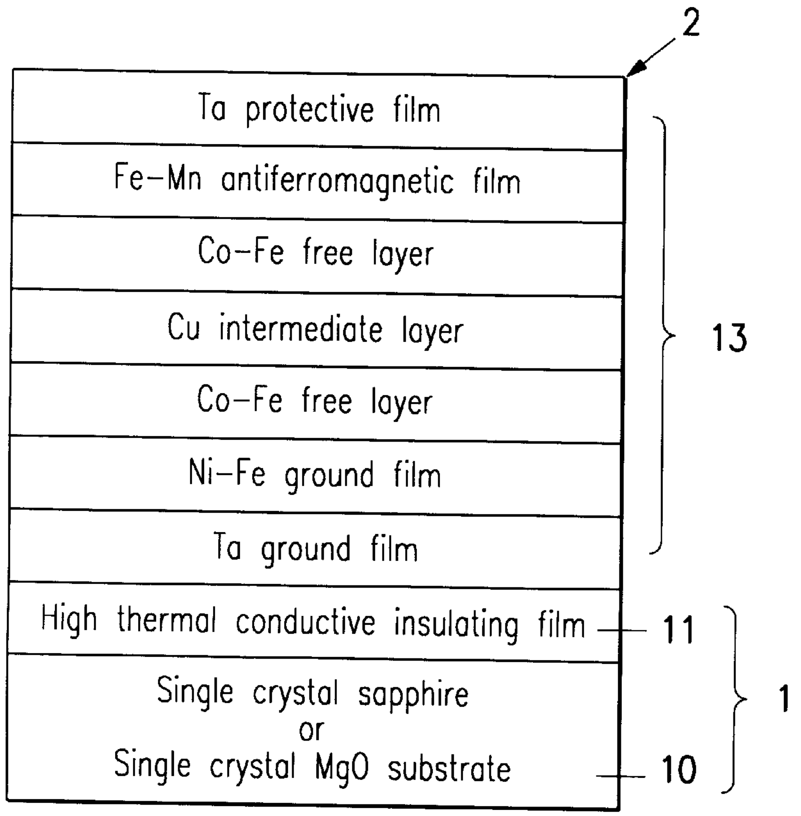

Alternatively, it is possible to form a magnetic film 13 as shown in FIG. 3 on a high thermal conductive insulating film 11 of the substrate 1 for thin film magnetic head as above to make a thin film magnetic head 2.

EXAMPLE

An example of the present invention is explained as follows:

For the $Al_2O_3$—TiC ceramics to form a substrate 10, there are used as the starting materials $Al_2O_3$ powder having purity of 99.9% and TiC powder having purity of 99.5% ceramics, which are weighed to make 70% by weight of $Al_2O_3$ and 30% by weight of TiC, and after adding $TiO_2$ of about 10% by weight based on TiC, the contents are mixed by an $Al_2O_3$ ball. Next, the mixed powder is molded and sintered in a hot plate at 1600° C. in a pressure of 250 kg/cm$^2$ for 1 hour. In the experiment, there is used the material having an average particle size of 0.4 μm as $Al_2O_3$ material powder and the material of average particle size of 0.3 μum as TiC powder to prepare a sintered member.

On the other hand, there is produced a single crystal sapphire as a single crystal, and a single crystal MgO by EFG process. Namely, a high purity $Al_2O_3$ or MgO is molten in an inert atmosphere, and a molybdenum die for growing a ribbon form single crystal provided internally with a slit so as to come into contact with $Al_2O_3$ or MgO solution is positioned. The solution is brought into contact with the solution at the upper end of the molybdenum die by capillary action, and the seed crystal is lifted up to produce a single crystal sapphire or a single crystal MgO.

The method for producing a single crystal sapphire or single crystal MgO is not limited to EFG process but any other method may be employed.

The resulting $Al_2O_3$—TiC sintered member, single crystal sapphire, and single crystal MgO in plate form are subjected to grinding with diamond wheel to process into disk form substrates 10, followed by surface lapping with diamond grinder.

Next, in case of the substrate 10 comprising $Al_2O_3$—TiC sintered member, using the diamond powder having the average particle size of 0.5 μm, the surface of the substrate 10 and the tin base plate are relatively slid to effect precise polishing. On the other hand, in case of the substrate 10 comprising a single crystal sapphire or a single crystal MgO, while supplying a polishing liquid wherein spherical $SiO_2$ fine powder having a particle size of no more than 50 nm is suspended in pure water, the surfaces of the substrate 10 and the polishing cloth are moved in relative sliding to carry out precision polishing.

By the above, in the case of the substrate 10 of $Al_2O_3$—TiC sintered member, one having surface roughness (Ra) of 18 Å, and in the case of the substrate 10 of single crystal sapphire and single crystal MgO, one having surface roughness (Ra) of 1 Å, are obtained.

Next, with respect to the substrate 10 of $Al_2O_3$—TiC sintered member, a ground film 12 comprising amorphous alumina is subjected to film forming in a thickness of 7 μm by a sputtering method by using a 99.5% alumina target, and then the resulting product is subjected to mirror surface finishing with a polishing liquid made by suspending spherical alumina fine powder in pure water, followed by final precision processing with the polishing liquid made by suspending spherical seria fine powder in pure water, to process ultimately into a ground film 12 comprising amorphous alumina with the thickness of 4 μm, and surface roughness (Ra) on the ground film 12 of 3 Å.

On the surface of these substrates 10, there is formed as a high thermal conductive insulating film 11 a film of AlN and amorphous carbon using ECR plasma sputtering by varying the film thickness, with which a substrate for thin film magnetic head of the present invention is produced.

As a comparative example, in the same procedure as above, there is formed a high heat conductive insulating film 11 of AlN and amorphous carbon on the above substrate 10 of $Al_2O_3$—TiC sintered member by varying the film thickness, without forming a ground film 12.

With respect to these substrates, firstly, the release condition in the film forming stage is confirmed with a differential interference microscope (X50), and the flatness variation rates before and after the film forming are measured with the laser interference flatness gauge, and the surface roughness on the high thermal conductive insulating film 11 with the AFM (Atomic Force Microscopy).

The results are as shown in Tables 2 and 3.

TABLE 2

| No. | Material quality of substrate | Ground film | High thermal conductive insulating film | Release in film forming | Surface roughness Ra (A) | Flatness variation amount |
|---|---|---|---|---|---|---|
| *1 | $Al_2O_3$—TiC | Amorphous alumina | No | No | 3 After mirror face forming | Small |
| *2 | $Al_2O_3$—TiC | No | A1N 10 Å | No | 20 | Small |
| *3 | $Al_2O_3$—TiC | No | A1N 100 Å | No | 25 | Medium |
| *4 | $Al_2O_3$—TiC | No | A1N 900 Å | Yes | — | — |
| *5 | $Al_2O_3$—TiC | No | Amorphous carbon 10 Å | No | 22 | Small |
| *6 | $Al_2O_3$—TiC | No | Amorphous carbon 100 Å | No | 28 | Medium |
| *7 | $Al_2O_3$—TiC | No | Amorphous carbon 900 Å | Yes | — | — |
| 8 | $Al_2O_3$—TiC | Amorphous alumina | A1N 10 Å | No | 4 | Small |
| 9 | $Al_2O_3$—TiC | Amorphous alumina | A1N 100 Å | No | 5 | Small |
| 10 | $Al_2O_3$—TiC | Amorphous alumina | A1N 1500 Å | No | 8 | Medium |
| *11 | $Al_2O_3$—TiC | Amorphous alumina | A1N 2000 Å | Yes | — | — |
| 12 | $Al_2O_3$—TiC | Amorphous alumina | Amorphous carbon 10 Å | No | 5 | Small |
| 13 | $Al_2O_3$—TiC | Amorphous alumina | Amorphous carbon 100 Å | No | 6 | Small |
| 14 | $Al_2O_3$—TiC | Amorphous alumina | Amorphous carbon 1500 Å | No | 9 | Medium |
| *15 | $Al_2O_3$—TiC | Amorphous alumina | Amorphous carbon 2000 Å | Yes | — | — |

Note:
The data marked with * are outside the present invention range.

TABLE 3

| No. | Material quality of substrate | Ground film | High thermal conductive insulating film | Release in film forming | Surface roughness Ra (A) | Flatness variation amount |
|---|---|---|---|---|---|---|
| 16 | Single crystal sapphire | No | A1N 10 Å | No | 2 | Small |
| 17 | Single crystal sapphire | No | A1N 100 Å | No | 2 | Small |
| 18 | Single crystal sapphire | No | A1N 1500 Å | No | 3 | Small |
| *19 | Single crystal sapphire | No | A1N 2000 Å | Yes | — | — |
| 20 | Single crystal sapphire | No | Amorphous carbon 10 Å | No | 2 | Small |
| 21 | Single crystal sapphire | No | Amorphous carbon 100 Å | No | 3 | Small |
| 22 | Single crystal sapphire | No | Amorphous carbon 1500 Å | No | 4 | Small |
| *23 | Single crystal sapphire | No | Amorphous carbon 2000 Å | Yes | — | — |
| 24 | Single crystal MgO | No | A1N 10 Å | No | 2 | Small |
| 25 | Single crystal MgO | No | A1N 100 Å | No | 3 | Medium |
| 26 | Single crystal MgO | No | A1N 1500 Å | No | 3 | Medium |
| *27 | Single crystal MgO | No | A1N 2000 Å | Yes | — | — |
| 28 | Single crystal MgO | No | Amorphous carbon 10 Å | No | 3 | Small |
| 29 | Single crystal MgO | No | Amorphous carbon 100 Å | No | 4 | Medium |
| 30 | Single crystal MgO | No | Amorphous carbon 1500 Å | No | 4 | Medium |
| *31 | Single crystal MgO | No | Amorphous carbon 2000 Å | Yes | — | — |

Note:
The data marked with * are outside the present invention range.

According to Table 2, in case of forming a high thermal conductive insulating film 11 of AlN, amorphous carbon direct on the substrate 10 of $Al_2O_3$—TiC sintered member (Nos. 2–7), because of the unsatisfactory surface roughness of the surface of the substrate 10, the surface roughness of the high thermal conductive insulating film 11 cannot be made into a flat surface of no more than 10 Å. Further, when the high thermal conductive insulating film 11 is formed to a thickness of 900 Å, release occurred.

On the other hand, with respect to the one made by film forming the ground film 12, mirror face finishing, and then film forming the high thermal conductive insulating film 11, very smooth surface is obtained. However, with respect to the ones having the thickness of the high thermal conductive insulating film 11 exceeding 1500 Å (Nos. 11, 15), release is observed.

Against the above, in the examples of the present invention in which the thickness of the high thermal conductive insulating film 11 kept in the range of 10–1500 Å (Nos. 8–10, 12–14), it is possible to make the surface roughness (Ra) of the high thermal conductive insulating film 11 no more than 10 Å without showing release.

Further, according to Table 3, in case of using a single crystal sapphire as a substrate 10, when the thickness of the high thermal conductive insulating film 11 exceeds 1500 Å (Nos. 19, 23), release is caused. However, in the present invention in which the thickness of the high thermal conductive insulating film 11 kept in the range of 10–1500 Å (Nos. 16–18, 20–22), as very smooth surface is obtained in the CMP processing, and moreover the high thermal conductive insulating film 11 is formed, so that the surface roughness of the product is remarkably improved in comparison with the case of the $Al_2O_3$—TiC sintered member shown in Table 2.

On the other hand, even in case of a substrate 10 of the single crystal MgO, when the thickness of the high thermal conductive insulating film 11 exceeds 1500 Å (Nos. 27, 31), release is caused. However, in the present invention examples in which the thickness of the high thermal conductive insulating film 11 is kept in the range of 10–1500 Å (Nos. 24–26, 28–30), there are obtained the products having the equivalent properties to those of single crystal sapphire. Also, because in this case the Young's modulus is smaller than the single crystal sapphire, the flatness variation amount is apt to become large.

Judging from the above results, as to the conditions for forming the surfaces which are smoother and less variable in flatness, the most suitable one is that made of the single crystal sapphire for the substrate 10 and in which the high heat conductive insulating film 11 such as AlN or amorphous carbon is formed with the thickness in the range of 10–1500 Å.

As described in detail above, according to the present invention, by constituting a substrate for thin film magnetic head by providing a high thermal conductive insulating film with the thickness in the range of 10–1500 Å with the thermal conductivity at room temperature higher than 45 W/m·K and the volume inherent resistance higher than $10^8$ Ω·cm on a substrate comprising ceramics or a single crystal, there can be obtained a substrate for thin film magnetic head of the present invention having extremely excellent heat radiation and insulation properties and extremely flat surface.

Accordingly, when a thin film magnetic head is formed by forming a magnetic film on the substrate for said thin film magnetic head, heat radiation of the area in the vicinity of the element can be increased, and the product can be suitably used even in case of using an MR head or GMR head.

What is claimed is:

1. A thin film magnetic head substrate comprising:

a substrate;

a high thermal conductive insulating film formed on the substrate, wherein the high thermal conductive insulating film has the thickness in the range of 10–1500 Å with the thermal conductivity at room temperature higher than 45 W/m·k and the volume inherent resistance higher than $10^8$ Ω·cm.

2. The thin film magnetic head substrate of claim 1, wherein the substrate comprises at least one of ceramic or single crystal.

3. The thin film magnetic head substrate of claim 1, wherein the high thermal conductive insulating film comprises at least one of AlN, BN, diamond-like-carbon and amorphous carbon.

4. The thin film magnetic head substrate of claim 3, further comprising a ground film formed between the substrate and the high thermal conductive insulating film.

5. The thin film magnetic head substrate of claim 3, wherein the high thermal conductive insulating film is formed on the ground film made of amorphous alumina.

6. The thin film magnetic head substrate of claim 1, wherein the surface of the high thermal conductive insulating film has surface roughness of no more than 10 Å according to atomic force microscopy.

7. The thin film magnetic head substrate of claim 1, further comprising a magnetic film on the high thermal conductive insulating film.

8. A thin film magnetic head substrate comprising:

a substrate comprising a single crystal;

a high thermal conductive insulating film formed on the substrate, wherein the high thermal conductive insulating film has the thickness in the range of 10–1500 Å and made of at least one of AlN, BN, diamond-like-carbon and amorphous carbon.

9. The thin film magnetic head substrate of claim 8, wherein the surface of the high thermal conductive insulating film has surface roughness of no more than 10 Å according to atomic force microscopy.

10. The thin film magnetic head substrate of claim 8, further comprising a magnetic film on the high thermal conductive insulating film.

* * * * *